United States Patent
Khair et al.

(10) Patent No.: US 12,361,084 B2
(45) Date of Patent: Jul. 15, 2025

(54) SYSTEM AND METHOD FOR REMOTE SENSING USING DATA FINGERPRINTING METHODOLOGIES

(71) Applicant: Raytheon Company, Waltham, MA (US)

(72) Inventors: Joseph D. Khair, El Segundo, CA (US); Christopher M. Cosner, El Segundo, CA (US)

(73) Assignee: Raytheon Company, Arlington, VA (US)

( * ) Notice: Subject to any disclaimer, the term of this patent is extended or adjusted under 35 U.S.C. 154(b) by 24 days.

(21) Appl. No.: 17/828,372

(22) Filed: May 31, 2022

(65) Prior Publication Data
US 2023/0418888 A1    Dec. 28, 2023

(51) Int. Cl.
*G06F 16/95* (2019.01)
*G06F 16/951* (2019.01)
*G06F 16/9537* (2019.01)

(52) U.S. Cl.
CPC ........ *G06F 16/9537* (2019.01); *G06F 16/951* (2019.01)

(58) Field of Classification Search
CPC .... G06F 16/9537; G06F 16/951; G06F 16/27; B64U 2101/30; B64G 1/1021; H04B 7/18513
See application file for complete search history.

(56) References Cited

U.S. PATENT DOCUMENTS

| 7,856,248 | B1* | 12/2010 | Fujisaki | H04M 1/0266 |
| | | | | 455/566 |
| 9,165,124 | B1* | 10/2015 | Gurevich | H04L 67/01 |
| 2004/0001201 | A1* | 1/2004 | Knapp | H04N 23/125 |
| | | | | 356/326 |
| 2018/0217888 | A1* | 8/2018 | Colgrove | G06F 11/3034 |
| 2018/0336543 | A1* | 11/2018 | Van Os | G06Q 20/108 |
| 2020/0307787 | A1* | 10/2020 | Theodore | G08G 5/0021 |
| 2021/0019937 | A1* | 1/2021 | Gallaway | G06T 17/05 |
| 2021/0136047 | A1* | 5/2021 | Wilson | H04L 9/3268 |
| 2021/0226927 | A1* | 7/2021 | Crabtree | G06N 5/022 |

(Continued)

FOREIGN PATENT DOCUMENTS

CN    202111342171 A * 11/2021    ............. H04N 5/232

*Primary Examiner* — Merilyn P Nguyen
(74) *Attorney, Agent, or Firm* — Schwegman Lundberg & Woessner, P.A.

(57) ABSTRACT

Systems and methods are provided for processing and storing remote sensing data. An exemplary method includes collecting information regarding a target based on an objective; receiving the information regarding the target; temporally storing the information regarding the target; deriving, using the information regarding the target, a first data fingerprint based on the objective; providing a library configured to store at least one data fingerprint; determining whether the library includes a second data fingerprint having the same objective; upon determining that the library includes the second data fingerprint, determining whether there is sufficient difference between the first data fingerprint and the second data fingerprint; and in response to determining there is sufficient difference between the first data fingerprint and the second data fingerprint, storing the information regarding the target in a remote sensing platform.

19 Claims, 3 Drawing Sheets

(56) References Cited

U.S. PATENT DOCUMENTS

| | | | |
|---|---|---|---|
| 2021/0383573 A1* | 12/2021 | Holt | G01S 7/497 |
| 2022/0121884 A1* | 4/2022 | Zadeh | G06N 3/006 |
| 2023/0231699 A1* | 7/2023 | Richarte | H04L 63/0428 |
| | | | 713/170 |

* cited by examiner

SYSTEM AND METHOD FOR REMOTE SENSING USING DATA FINGERPRINTING METHODOLOGIES

BACKGROUND

Various customers use space and airborne systems for disparate purposes to gather data while at a distance from the object of interest. This category of data collection, and the engineering that supports it, is often referred to as "remote sensing."

Successful execution of remote sensing requires platforms to be equipped with sensors capable of detecting and recording energy, reflected, or emitted. These platforms come in many shapes, sizes, forms, and complexities, and the mounted sensors are equally diverse. Some sensors are designed for imaging, while others are focused on radio frequency (RF) gathering.

Space-based remote sensing platforms are prevalent and used by many. Moreover, space-based remote sensing platforms commonly use a variety of sensors and combine data sensing with onboard data storage technologies regardless of the sensor type. These data recorders are sized to account for the sensor collection output and the anticipated revisit time to a ground station. The revisit time may dictate how often space-based remote sensing platforms can off-load data to terrestrial systems for processing and dissemination. Factors such as orbital geometry and downlink performance (swath pattern, bandwidth, bitrate, compression scheme, etc.) may impact the regularity and speed of each data downlink pass.

SUMMARY

According to one aspect of the subject matter described in this disclosure, a method for the processing and storing remote sensing data is provided. The method includes the following: collecting information regarding a target based on an objective; receiving the information regarding the target; temporally storing the information regarding the target; deriving, using the information regarding the target, a first data fingerprint based on the objective; providing a library configured to store at least one data fingerprint; determining whether the library includes a second data fingerprint having the same objective; upon determining that the library includes the second data fingerprint, determining whether there is sufficient difference between the first data fingerprint and the second data fingerprint; and in response to determining there is sufficient difference between the first data fingerprint and the second data fingerprint, storing the information regarding the target in a remote sensing platform.

According to another aspect of the subject matter described in this disclosure, a system for processing and storing remote sensing data is provided. The system includes one or more computing device processors. One or more computing device memories are coupled to the one or more computing device processors. The one or more computing device memories store instructions executed by the one or more computing device processors. The instructions are configured to: collect information regarding a target based on an objective; receive the information regarding the target; temporally store the information regarding the target; providing a library configured to store at least one data fingerprint; determine whether the library includes a second data fingerprint having the same objective; upon determining that the library includes the second data fingerprint, determine whether there is sufficient difference between the first data fingerprint and the second data fingerprint; and in response to determining there is sufficient difference between the first data fingerprint and the second data fingerprint, store the information regarding the target in a remote sensing platform.

According to another aspect of the subject matter described in this disclosure, a non-transitory computer-readable storage medium is provided. The non-transitory computer-readable storage medium stores instructions which when executed by a computer causing the computer to perform a method for processing and storing remote sensing data, the method comprising: collecting information regarding a target based on an objective; receiving the information regarding the target; temporally storing the information regarding the target; deriving, using the information regarding the target, a first data fingerprint based on the objective; providing a library configured to store at least one data fingerprint; determining whether the library includes a second data fingerprint having the same objective; upon determining that the library includes the second data fingerprint, determining whether there is sufficient difference between the first data fingerprint and the second data fingerprint; and in response to determining there is sufficient difference between the first data fingerprint and the second data fingerprint, storing the information regarding the target in a remote sensing platform.

Additional features and advantages of the present disclosure is described in, and will be apparent from, the detailed description of this disclosure.

BRIEF DESCRIPTION OF THE DRAWINGS

The disclosure is illustrated by way of example, and not by way of limitation, in the figures of the accompanying drawings in which like reference numerals are used to refer to similar elements. It is emphasized that various features may not be drawn to scale and the dimensions of various features may be arbitrarily increased or reduced for clarity of discussion.

DETAILED DESCRIPTION

The figures and descriptions provided herein may have been simplified to illustrate aspects that are relevant for a clear understanding of the herein described devices, systems, and methods, while eliminating, for the purpose of clarity, other aspects that may be found in typical similar devices, systems, and methods. Those of ordinary skill may recognize that other elements and/or operations may be desirable and/or necessary to implement the devices, systems, and methods described herein. But because such elements and operations are well known in the art, and because they do not facilitate a better understanding of the present disclosure, a discussion of such elements and operations may not be provided herein. However, the present disclosure is deemed to inherently include all such elements, variations, and modifications to the described aspects that would be known to those of ordinary skill in the art.

The terminology used herein is for the purpose of describing particular example embodiments only and is not intended to be limiting. For example, as used herein, the singular forms "a", "an" and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Although the terms first, second, third, etc., may be used herein to describe various elements, components, regions, layers and/or sections, these elements, components, regions, layers and/or sections should not be limited by these terms. These terms may be only used to distinguish one element, component, region, layer or section from another element, component, region, layer or section. That is, terms such as "first," "second," and other numerical terms, when used herein, do not imply a sequence or order unless clearly indicated by the context.

This disclosure describes a system architecture for a remote sensing platform that utilizes data fingerprinting methodologies for storing and downlinking collected information. The system architecture uses various approaches to reduce data capture quantity while still ensuring the content of interest is gathered, stored, and downlinked. Moreover, the disclosure addresses sensor data storage and downlink efficiency by validating data upon collection and storing only data that meets or exceeds threshold criteria. Also, the disclosure describes optimizing the hardware design of remote sensing platforms by implementing a modified architecture for data storage and adjudication.

Figure 1:
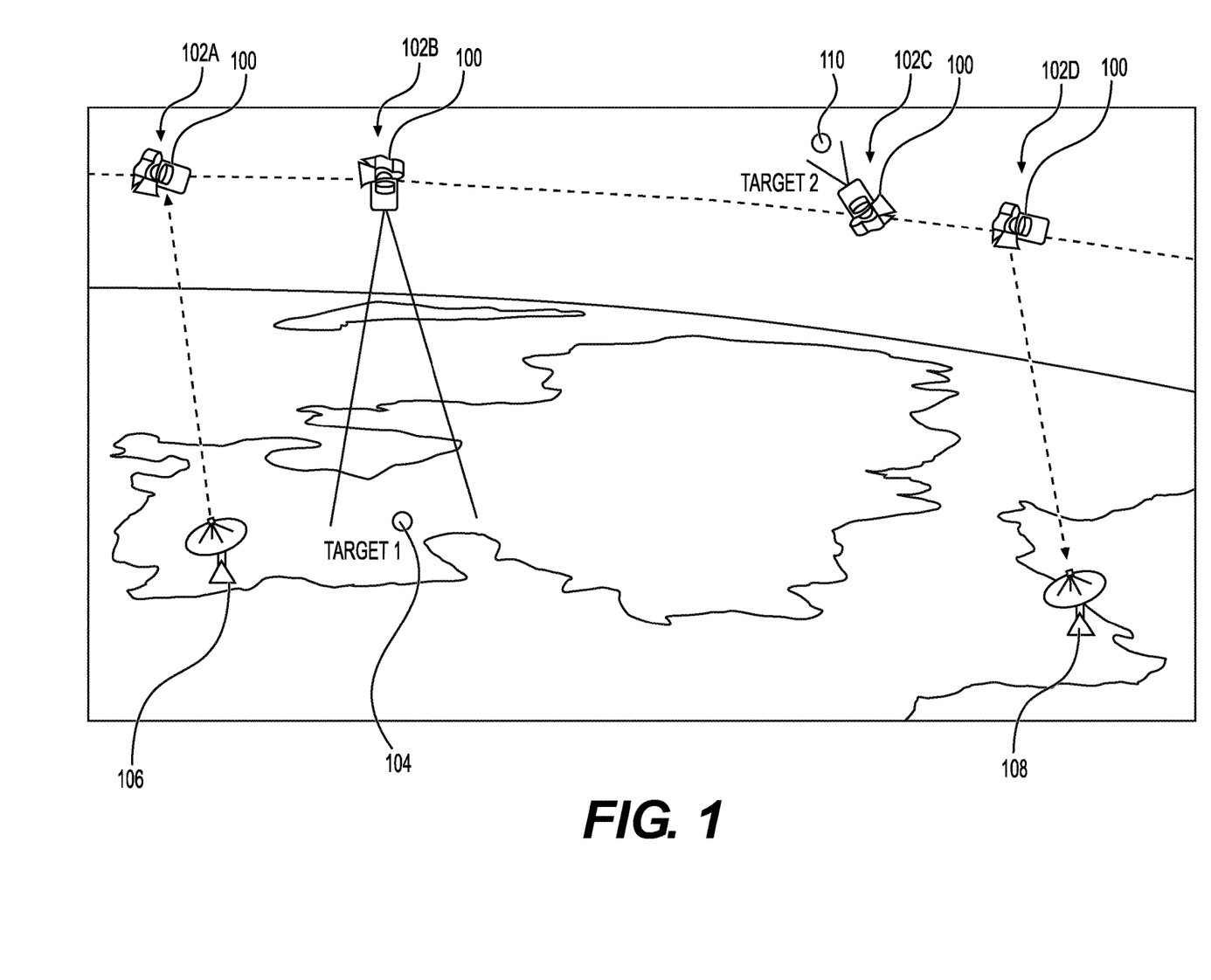
FIG. 1 is a schematic diagram of an overview of the operation of a remote sensing platform, in accordance with some embodiments.

FIG. 1 is a schematic diagram of an overview of the operation of a remote sensing platform 100, in accordance with some embodiments. The remote sensing platform 100 is positioned at a certain elevation from a planetary body 114 along an orbit defined by navigational points 102A-102D. The remote sensing platform 100 moves at a defined speed to maintain the orbit above planetary body 114, and is collecting information at specific targets 104 or 110 at navigational points 102B and 102C. Moreover, the remote sensing platform 100 may make several passes at targets 104 and/or 110 along its orbit to collect and/or downlink information.

Ground stations 106 and 108 are configured to send and receive data from remote sensing platform 100 during one or more passes at navigational points 102A and 102D. Ground station 106 may upload data to remote sensing platform 100 at navigational point 102A, and ground station 108 may receive downloaded data from remote sensing 100 at navigational point 102D. Ground station 106 may upload information to remote sensing platform 100, such as navigational commands, update commands to key components of remote sensing platform 100, or the like. Ground station 108 may be configured to analyze the downloaded data of targets 104 and/or 110.

The remote sensing platform 100 includes several sensors used to collect information regarding targets 104 or 110. Target 104 is positioned on planetary body 114, while target 110 is positioned in space and away from planetary body 114. The remote sensing platform 100 may be equipped to collect the electromagnetic signals emitted or reflected from target 104 or 110. The information associated with the collected electromagnetic signals from target 104 or 110 is stored in the onboard storage of remote sensing platform 100. The remote sensing platform 100 may include navigational equipment to control the orientation of remote sensing platform 100 to collect the electromagnetic signals from target 104 or 110 and navigate the remote sensing platform 100 across navigational points 102A-102D along its orbit.

When sizing the onboard storage and data communications link parameters of remote sensing platform 100, it is important to understand the amount of data being captured. Subsequently, the overall spacecraft power, mass and volume is a function of the sizing of these parameters. The remote sensing platform 100 utilizes a data processing strategy that reduces data capture quantity (not quality) while still ensuring the content of interest is gathered, stored, and downlinked.

Figure 2:
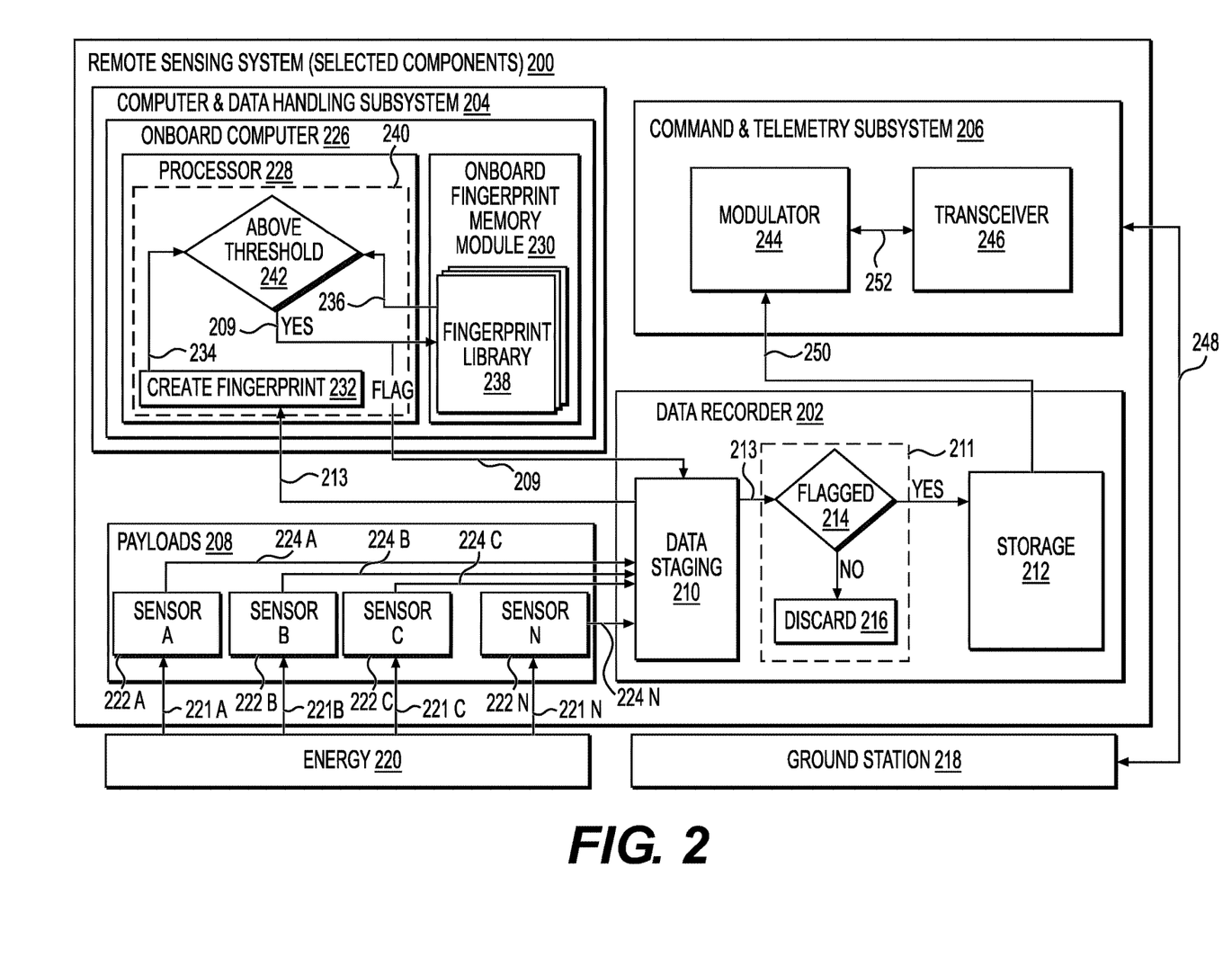
FIG. 2 is a schematic diagram of a detailed view of a remote sensing platform, in accordance with some embodiments.

In this data processing framework, each time remote sensing platform 100 collects the desired data set (image, RF collection, etc.), the desired data set is tagged with a unique signature or fingerprint. This fingerprint is stored in a Fingerprint Library (FL) 238 within a dedicated Onboard Fingerprint Memory Module (OFMM) 230 of remote sensing platform 100 for algorithmic comparisons, which is discussed further hereinafter. Specific data fingerprints may be previously known (and loaded to the FL 238) or dynamically derived onboard remote sensing system 100 and added in real-time to the FL 238 upon data capture. Future data captures are then compared against prior stored captures of the same objective from the FL and adjudicated. If the comparison exceeds one or more predetermined thresholds, also held within the FL 238 stored in the OFMM 230, the data is stored in onboard memory for downlinking. Once stored, and before downlink, the sensor data is also available for additional onboard processing, metadata modification, or the like.

In some embodiments, remote sensing system 100 is a space-based remote sensing system. In some embodiments, remote sensing system 100 is unmanned aerial vehicle (UAV). In some embodiments, remote sensing system 100 is a space-based remote sensing system.

In some embodiments, ground station 106 may upload altitude and movement information to remote sensing platform 100 for navigation purposes. In some embodiments, ground station 106 and/or ground station 108 may monitor the remote sensing platform and information about its critical systems.

FIG. 2 is a schematic diagram of a detailed view of a remote sensing platform 200, in accordance with some embodiments. The remote sensing system 100 of FIG. 1 is similar to remote sensing system 200, including performing similar operations. Remote sensing platform 200 includes a data recorder 202, a computer and data handling subsystem 204, a command & telemetry subsystem 206, and a payload subsystem 208. The payload subsystem 208 includes several sensors 222A-222N that each receives an electromagnetic energy signal 221A-221N emitted or reflected from a target 220 from either a planetary body or in space. The sensors 222A-222N generate output signals 224A-224N, a data set of information collected from target 220.

The data recorder 200 includes a data staging block 210 receiving output signals 224A-224N from payload 208. For every new data set associated with output signals 224A-224N received by data staging block 210, the data staging block 210 processes output signals 224A-224N into a processed data set 213, such as an image or the like. The data staging block 210 sends to computer and data handling subsystem 204 processed data set 213 and temporally stores process data set 213 until a determination by processing block 211 is made as to whether processed data set 213 is stored in onboard storage 212.

The processing block 211 determines, at step 214, whether flag signal 209 from the computer and data handling subsystem 204 indicates that processed data set 213 may be stored in onboard storage 212. If the indication from flag signal 209 is positive, the processed data set 213 is stored in onboard storage 212. Otherwise, the processed data set 213 is discarded and deleted from remote sensing platform 200 by data staging block 210, at step 216.

In some embodiments, the processing block 211 is software code stored and executed in data staging block 210. In this embodiment, the data staging block 210 includes memory and one or more processing units for executing the processing block 211 and processing output signals 224A-224N. In some embodiments, the processing block 211 is performed by a programmable device in data staging block 210. In some embodiments, the data staging block 210 includes a programmable device to process output signals 224A-224N.

The computer and data handling subsystem 204 receives processed data set 213 from data staging block 210 and analyzes the processed data set 213 to determine whether data staging block 210 should store it in onboard storage 212. The computer and data handling subsystem 204 includes a processor 228 and an OFFM 230. In particular, the processor 228 performs or executes a processing block 240 that evaluates whether the processed data set 213 has new and relevant information.

The processing block 240 directs processor 228 to receive the processed data set 213 and create a data fingerprint 234, at block 232, associated with processed data set 213. The data fingerprint 234 is a unique signature defining data set 213. The OFFM 230 stores previously processed data fingerprints 236 in a Fingerprint Library (FL) 238 within OFMM 230. A decision block 242 performs algorithmic comparisons between data fingerprint 234 and an existing data fingerprint 236 previously stored in OFFM 230 of the same objective from FL 238 and adjudicated.

If the comparison exceeds one or more predetermined thresholds, then decision block 242 sends an indication via flag 209 to data staging block 210 that processed data set 213 is to be stored in onboard storage 212 for downlinking. The one or more predetermined thresholds may be held within FL 238 stored in OFMM 230. Also, decision block 242 sends an indication via flag 209 to OFFM 230 that the existing data fingerprint 236 in FL 238 needs to be updated to data fingerprint 234. Otherwise, decision block 238 sends an indication via flag 209 to data staging block 210 to discard processed data set 213, and the existing data fingerprint 236 is returned to FL 238 and OFFM 230.

The command and telemetry subsystem 206 is the communication system for remote sensing platform 200 to link with ground station 218. In particular, command and telemetry subsystem 206 includes a modulator 244 and a transceiver 246. When ground station 218 is ready for a downlink, it sends a message via an RF communication link 248 to transceiver 246 indicating its desire for selected information stored in onboard storage 212 to be downloaded. In this case, onboard storage 212 retrieves the requested download information 250 and sends it to modulator 244. The modulator 244 performs the necessary modulation operations to create a transmit signal 252 containing download information 250. The transceiver 246 receives signal 252 and prepares it to be sent to ground station 218 via RF communication link 248.

As an example, consider a Low Earth Orbit (LEO) space-based remote sensing platform similar to remote sensing platforms 100 and 200. This satellite operates in a circular orbit (ecc=0) with an altitude of 550 km, an inclination of 53°, and a LAN of 0°. This LEO satellite is an imaging platform equipped with a sensor that produces an image size measuring 5120 by 5120 pixels. Each pixel has a 10-bit depth.

Sensor (Mission) data is downlinked using an X-band antenna with 20 Mbps data rate. This imaging satellite uses a geographically diverse ground entry point network of antennas to facilitate contact windows and sensor data downlink. Contacts and sensor data downloads are not guaranteed daily, hence, an onboard storage device has been included in the vehicle design that allows for 3 days of sensor data storage in the baseline configuration.

While many of these parameters vary between designs, the goal is to provide an example that demonstrates the real-world benefits gained from implementing the data processing strategy described herein.

While it is understood that the vehicle makes use of a network of ground entry points, the following are a list of calculations associated with a particular station to understand the contact times that can be expected. Los Angeles, CA, USA serves as this sample ground entry point at (lat, long)=(34°, −118.5°):

1) Earth Angle Radius ($\rho$)

$$\sin\rho = \frac{R_E}{R_E + H} = \frac{6378}{6378 + 550} = 0.9206$$

$$\rho = 67°$$

where $R_E$ is the average Earth radius and H is the altitude of the orbit.

2) Satellite Period (P)

$$P = 2\pi\sqrt{\frac{a^3}{\mu}} = 2\pi\sqrt{\frac{6928^3}{3.986 \times 10^5}} = 5739 \text{ s} = 95.6 \text{ min}$$

where a is the orbit semi-major axis and $\mu$ is the standard gravitational constant (398600.4418 km$^3$/s$^2$)

3) Max nadir angle ($\eta_{max}$)

$$\sin\eta_{max} = \sin\rho \cos\varepsilon_{min} = \sin(67°)\cos(5°) = 0.917$$

$$\eta_{max} = 66.5°$$

where $\rho$ is the Earth angle radius and $\varepsilon_{min}$ represents the minimum allowable elevation angle from the ground station (typically 5°).

4) Max Earth central angle ($\lambda_{max}$)

$$\lambda_{max} = 90° - \varepsilon_{min} - \eta_{max} = 90° - 5° - 66.5° = 18.5°$$

5) Instantaneous orbit pole (lat$_{pole}$, long$_{pole}$)

$$\text{lat}_{pole} = 90° - i = 90° - 53° = 37°$$

$$\text{long}_{pole} = L_{node} - 90° = 0° - 90° = -90°$$

6) Min Earth central angle ($\lambda_{min}$)

$$\sin(\lambda_{min}) = \sin(\text{lat}_{pole})\sin(\text{lat}_{gs}) + \cos(\text{lat}_{pole})\cos(\text{lat}_{gs})\cos(\Delta\text{long})$$

$$\sin(\lambda_{min}) = \sin(37°)\sin(34°) + \cos(37°)\cos(-118.5°)\cos(28.5°)$$

$$\lambda_{min} = 0.1°$$

7) Time in-view to ground station (T)

$$T = \frac{P}{180°}\cos^{-1}\left(\frac{\cos\lambda_{max}}{\cos\lambda_{min}}\right) = \frac{5739 \text{ s}}{180°}\cos^{-1}\left[\frac{\cos(18.5°)}{\cos(0.1°)}\right] = 590 \text{ s} = 9.8 \text{ min}$$

Having gained an understanding of the orbital geometry and its impact on the timing of the contact windows, now one should consider the amount of sensor data accumulated, the space required to store it onboard and the time (associated number of ground station contacts) it will take to downlink the data. The following are a list of calculations associated with the amount of sensor data accumulated:

8) Raw sensor data size ($D_r$)

$$D_r = nX = 2(5120 \times 5120 \times 10) = 524.288 \text{ Mb/rev} = 65.536 \text{ MB/rev}$$

where n is the number of sensor data collections in one rev (satellite orbit period) and X is the sensor collect data size (bits).

9) Sensor data size including overhead ($D_t$)

$$D_t = (1+f_o)D_r = (1+0.3)(524.288 \text{ Mb/rev}) = 681.574 \text{ Mb/rev} = 85.1968 \text{ MB/rev}$$

where $f_0$ is the overhead factor, applied to account for the additional data not containing sensor information that is required to ensure successful storage and downlink.

10) Stored sensor data size ($D_s$)

$$D_s = D_d = rd_sD_t = (3)(16)(681.574 \text{ Mb/rev}) = 32.716 \text{ Gb} = 4.089 \text{ GB}$$

where r is the number of rev per day and $d_s$ is the desired number of days of sensor data storage between complete downlink.

11) Required time to downlink stored data ($T_s$)

$$T_s = \frac{D_s}{r_{dl}} = \frac{(32.716 \text{ Gb})(1000)}{20} = 1636 \text{ s} = 27.26 \text{ min}$$

where $r_{dl}$ is the rate of the data transmit link (downlink rate).

In the baseline configuration, storage of the collected sensor data requires ~4.089 GB and will take nearly 3 full passes over the ground station to completely downlink. Of course, this downlink (and storage) must also be managed alongside any other housekeeping needs onboard the remote sensing system, likely increasing these capacity requirements further.

Now, consider the same scenario with implementation of the data processing methodologies for remote sensing platforms described herein. In this case, all the orbital calculations 1-7 remain unchanged.

By adjudicating sensor data before it is stored, the onboard processing system avoids the storage and future downlinking of redundant and unnecessary data. Discarding this sensor data before storage eliminates future resource burden issues faced in the baseline proposition.

Many remote sensing missions are tasked with routine and repetitive sensing of the same objects or areas. Applying the described data fingerprinting and comparison technique to a remote sensing system such as this can save 30% or more on stored data and downlink requirements. This is due to the high match rate in sensed content between observations.

Examining the storage and downlink sizing calculations, one can see that modifications must be applied. On average, over a 3-day sensing period, stored images may be reduced by 30% (or more). Introducing a new efficiency term ($f_e$) to account for this savings the following is derived:

12) Stored sensor data size ($D_s$)

$$D_s = D_d = rd_sD_t(1-f_e) = (3)(16)(681.574 \text{ MB/rev})(1-0.3) = 22.9 \text{ Gb} = 2.862 \text{ GB}$$

Note the addition of a new term, $f_e$, to the above calculation. This term represents the data efficiency gained by implementation of the fingerprinting technique described herein.

13) Required time to downlink stored data ($T_s$)

$$T_s = \frac{D_s}{r_{dl}} = \frac{(22.9 \text{ Gb})(1000)}{20} = 1145 \text{ s} = 19.08 \text{ min}$$

The described enhanced design facilitates over 1 GB of stored data savings per day and allows the stored. Data is to be fully downlinked in just over two passes of the ground station. Of course, the efficiency factor ($f_e$) is dependent on the sensor observations, and particular data sets (quiescent) will yield even more drastic data resource savings.

Figure 3:
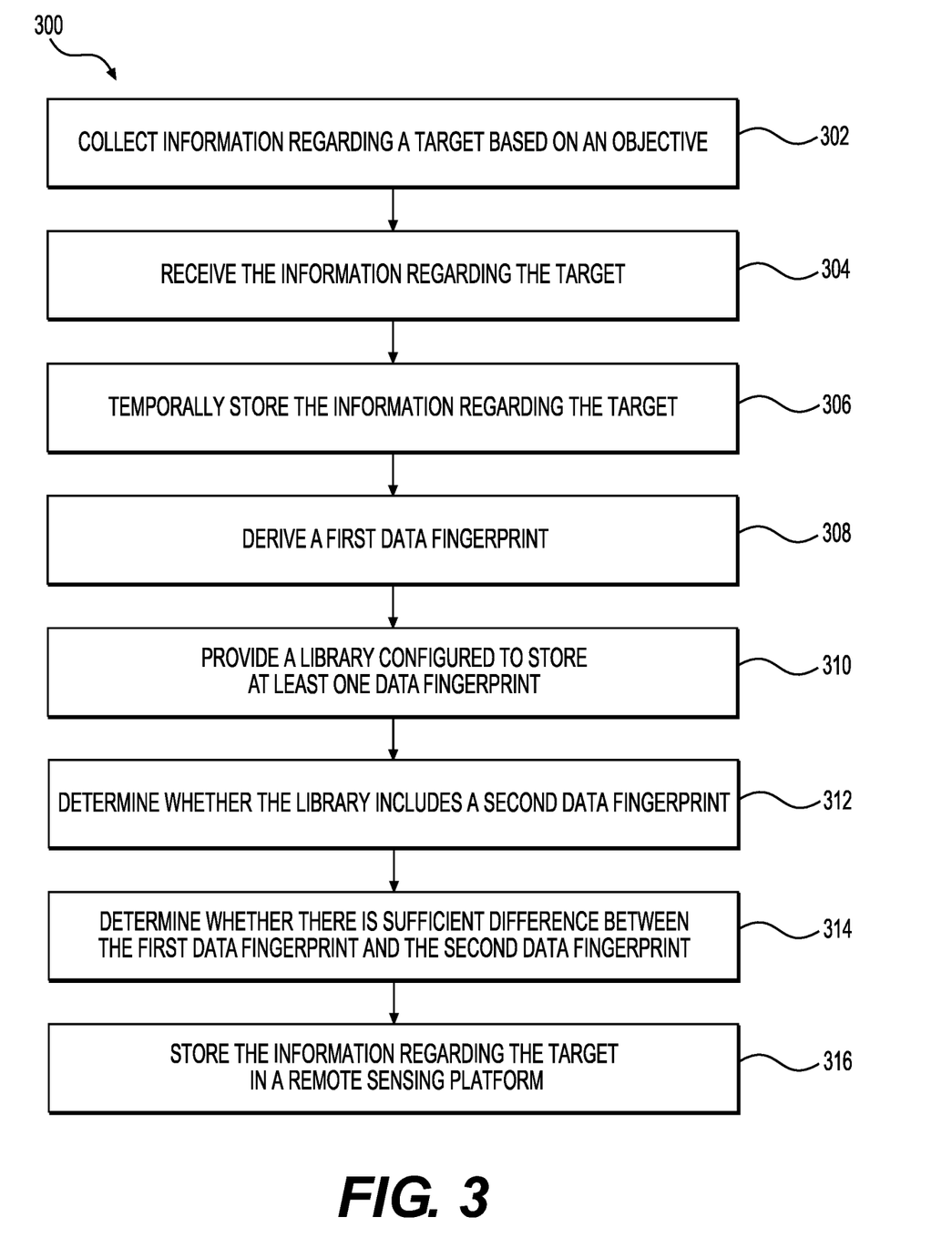
FIG. 3 is a process flowgraph of operations included in an example process for processing remote sensing data, in accordance with some embodiments.

FIG. 3 is a process flowgraph of operations included in an example process 300 for processing remote sensing data, in accordance with some embodiments. The operations may be implemented using computer-executable instructions stored on one or more non-transitory machine-readable storage media. The instructions may be executed by one or more processing devices, such as the processor 228 and/or data stage block 210, as described in FIG. 2, to implement the operations.

Process 300 includes collecting information, such as electromagnetic signals 221A-221N, regarding a target (such as target 104, 110, or 220), based on an objective (Step 302). Process 300 includes receiving the information regarding the target (Step 304). The information regarding the target is temporally stored (Step 306). Process 300 deriving, using the information regarding the target, a first data fingerprint (such as data fingerprint 234) based on the objective (Step 308).

A library (such as library 238) is provided that is configured to store at least one data fingerprint (Step 310). Moreover, process 300 includes determining whether the library includes a second data fingerprint (such as data fingerprint 234) having the same objective (Step 312). Upon determining that the library includes the second data fingerprint, process 300 includes determining whether there is sufficient difference (such as processing block 240) between the first data fingerprint and the second data fingerprint (Step 314). In response to determining there is sufficient difference between the first data fingerprint and the second data fingerprint, process 300 includes storing the information regarding the target in a remote sensing platform (such as remote sensing platform 100 or 200) (Step 316).

In some embodiments, the objective is a grid point used by the remote sensing platform. In some embodiments, the objective is a specific identifier associated with a region on a planetary body. In some embodiments, the objective is a specific identifier associated with a region in space.

The disclosure describes a system architecture used in a remote sensing system. The advantages provided by the system architecture include a data processing strategy that reduces data capture quantity (not quality) while still ensuring the content of interest is gathered, stored, and downlinked. Also, the system architecture manages the sensor data storage and downlink efficiency by validating data upon collection and storing only data that meets or exceeds threshold criteria (user-defined). Moreover, the system architecture optimizes the hardware design of remote sensing platforms by implementing a modified architecture for data storage and adjudication.

Reference in the specification to "one implementation" or "an implementation" means that a particular feature, structure, or characteristic described in connection with the implementation is included in at least one implementation of the disclosure. The appearances of the phrase "in one implementation," "in some implementations," "in one instance," "in some instances," "in one case," "in some cases," "in one embodiment," or "in some embodiments" in various places in the specification are not necessarily all referring to the same implementation or embodiment.

Finally, the above descriptions of the implementations of the present disclosure have been presented for the purposes of illustration and description. It is not intended to be exhaustive or to limit the present disclosure to the precise form disclosed. Many modifications and variations are possible in light of the above teaching. It is intended that the scope of the present disclosure be limited not by this detailed description, but rather by the claims of this application. As will be understood by those familiar with the art, the present disclosure may be embodied in other specific forms without departing from the spirit or essential characteristics thereof. Accordingly, the present disclosure is intended to be illustrative, but not limiting, of the scope of the present disclosure, which is set forth in the following claims.

What is claimed is:

1. A method for processing and storing remote sensing data, the method comprising:
    collecting, using one or more sensors on an orbiting remote sensing platform, an image of a target based on an objective to image a stationary geographic region;
    receiving, using the remote sensing platform, data of the image;
    temporally storing the data of the image in the remote sensing platform;
    deriving, based on the data of the image, a first data fingerprint;
    providing a library configured to store at least one data fingerprint;
    determining whether the library includes a second data fingerprint having the same objective;
    upon determining that the library includes the second data fingerprint, determining whether there is sufficient difference between the first data fingerprint and the second data fingerprint using a user-defined threshold;
    in response to determining there is sufficient difference between the first data fingerprint and the second data fingerprint, associating a flag with the image data; and
    storing, by a data recorder, the image data in the remote sensing platform only if the image data includes the associated flag and discarding any image data not associated with the flag.

2. The method of claim of 1, wherein the objective includes a grid point used by the remote sensing platform.

3. The method of claim of 1, wherein collecting the information comprises providing a plurality of sensors to collect the information regarding the target.

4. The method of claim of 3, wherein the collected information comprises emitted or reflected electromagnetic energy.

5. The method of claim of 2, wherein deriving the first data fingerprint comprises mapping the information regarding the target to the objective.

6. The method of claim of 1, wherein providing the library comprises storing the library in the remote sensing platform.

7. The method of claim of 1, wherein determining whether there is sufficient difference between the first data fingerprint and the second data fingerprint comprises performing an algorithmic comparison between the first data fingerprint and the second data fingerprint.

8. The method of claim of 1, wherein storing the information comprises sending an indication to a subsystem of the remote sensing platform to store the information regarding the target.

9. The method of claim of 8 further comprising upon sending the indication to the subsystem, updating the second data fingerprint with the first data fingerprint in the library.

10. A remote sensing platform for processing and storing remote sensing data, the system comprising:
    an imaging device on an orbiting remote sensing platform;
    one or more computing device processors;
    a library including fingerprint data stored thereon; and
    one or more computing device memories, coupled to the one or more computing device processors, the one or more computing device memories storing instructions executed by the one or more computing device processors, wherein the instructions are configured to:
    collect, using the mobile orbiting imaging device, image data of a target based on an objective to image a stationary geographic region;
    receive, using the remote sensing platform, the image data;
    temporally store the image data in the remote sensing platform;
    determine whether the library includes a second data fingerprint having the same objective;
    upon a determination that the library includes the second data fingerprint, determine whether there is sufficient difference between the first data fingerprint and the second data fingerprint using a predetermined user-defined threshold;
    in response to determining there is sufficient difference between the first data fingerprint and the second data fingerprint, associating a flag with the image data; and
    store, by a data recorder, the image data in the remote sensing platform only if the image data includes the associated flag and discarding any image data not associated with the flag.

11. The system of claim 10, wherein the objective includes a grid point used by the remote sensing platform.

12. The system of claim 10, wherein while collecting the information, the instructions are configured to provide a plurality of sensors to collect the information regarding the target.

13. The system of claim 12, wherein the collected information comprises emitted or reflected electromagnetic energy.

14. The system of claim 11, wherein while deriving the first data fingerprint, the instructions are configured to map the information regarding the target to the objective.

15. The system of claim 10, wherein while determining whether there is sufficient difference between the first data fingerprint and the second data fingerprint, the instructions are configured to perform an algorithmic comparison between the first data fingerprint and the second data fingerprint.

16. The system of claim of 10, wherein while storing the information, the instructions are configured to send an indication to a subsystem of the remote sensing platform to store the information regarding the target.

17. The system of claim of 16, wherein the instructions are further configured to, upon sending the indication to the subsystem, update the second data fingerprint with the first data fingerprint in the library.

18. A non-transitory computer-readable storage medium storing instructions which when executed by a computer cause the computer to perform a method for processing and storing remote sensing data, the method comprising:
   collecting, using one or more sensors on an orbiting remote sensing platform, an image of a target based on an objective to image a stationary geographic region;
   receiving, using the remote sensing platform data of the image;
   temporally storing the data of the image in the remote sensing platform;
   deriving, based on the data of the image, a first data fingerprint;
   providing a library configured to store at least one data fingerprint;
   determining whether the library includes a second data fingerprint having the same objective;
   upon determining that the library includes the second data fingerprint, determining whether there is sufficient difference between the first data fingerprint and the second data fingerprint using a predetermined user-defined threshold;
   in response to determining there is sufficient difference between the first data fingerprint and the second data fingerprint, associating a flag with the image data; and
   storing the image data in the remote sensing platform only if the image data includes the associated flag and discarding any image data not associated with the flag.

19. The non-transitory computer-readable storage medium of claim 18 further comprising in response to determining there is sufficient difference between the first data fingerprint and the second data fingerprint, updating the second data fingerprint with the first data fingerprint in the library.

* * * * *